Jan. 24, 1928.

W. C. BRINTON, JR 1,657,196

GREASE CUP

Filed June 23, 1925

INVENTOR
WILLIAM C. BRINTON, JR.
BY *White Prost Evans*
HIS ATTORNEYS:

Patented Jan. 24, 1928.

1,657,196

UNITED STATES PATENT OFFICE.

WILLIAM C. BRINTON, JR., OF LARKSPUR, CALIFORNIA, ASSIGNOR TO THE GREAS-OMETER CORPORATION, OF SAN FRANCISCO, CALIFORNIA, A CORPORATION OF CALIFORNIA.

GREASE CUP.

Application filed June 23, 1925. Serial No. 38,957.

This invention relates to forced feed or automatic grease cups into which a charge of grease or other suitable lubricant is introduced under pressure and maintained under pressure whereby the grease is slowly expelled to the bearing or other instrumentality to be lubricated. More particularly this invention relates to grease cups for the use of light oils, light greases and semifluids of this character as distinguished from the heavier and stiffer oils and greases, which are more or less of a semi-solid nature. In devices of this character the grease or other lubricant is ejected from the grease cup through a hollow tube having a small diameter bore. The resistance offered to the discharge of grease through the tube, all other factors being equal, depends upon the length of the tube or the diameter of the bore of the tube so that by varying either the length or the bore of tube the rate at which the grease is to be discharged from the cup may be varied. For heavier oils and the use of semi-solids such tubes have been found satisfactory, since it has been found commercially expedient to manufacture tubes with a diameter sufficiently small to offer the necessary resistance to such lubricants; however, certain difficulties have arisen in connection with the use of such tubes for the lighter oils, lighter greases and lubricants of a semi-liquid character in that the lubricant flowed too freely through the same, due to the fact that the diameter of such tubes was too large and the resistance offered was insufficient. While it may be possible to manufacture tubes having a bore sufficiently small in cross section and of the proper length in laboratories and at considerable expense, it has not been found commercially practical to manufacture such tubes.

It is an object of this invention to provide a feed tube for grease cups having a large friction surface with a feed passage of small cross sectional area especially adapted for the use of lighter greases, lighter oils and lubricants of a semi-fluid character which may be readily and cheaply manufactured and which will operate in a safe and reliable manner.

Another object of the invention is to provide a feed tube for grease cups of the character specified which has means whereby the internal resistance may be varied to suit the needs of the particular lubricant that is to be used.

The invention possesses other advantageous features some of which with the foregoing, will be set forth at length in the following description where I shall outline in full that form of my invention which I have selected for illustration in the drawings accompanying and forming part of the present specification. In said drawings I have shown one form of grease cup embodying my invention, but it is to be understood that I do not limit myself to such form since the invention as set forth in the claims may be embodied in a plurality of forms.

Figure 1:
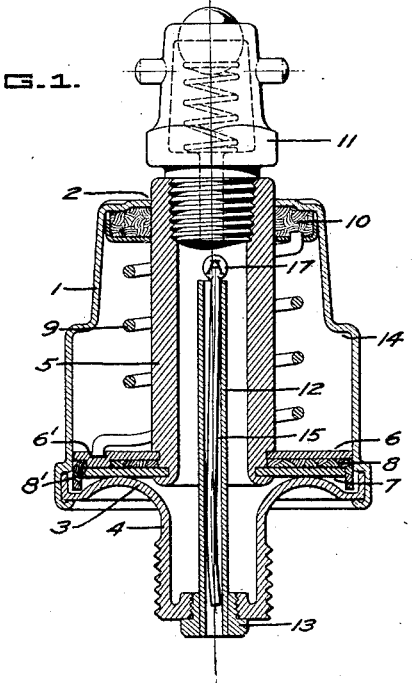
Figure 1 is a vertical section through a grease cup embodying my invention with parts shown in elevation.
Figure 2:
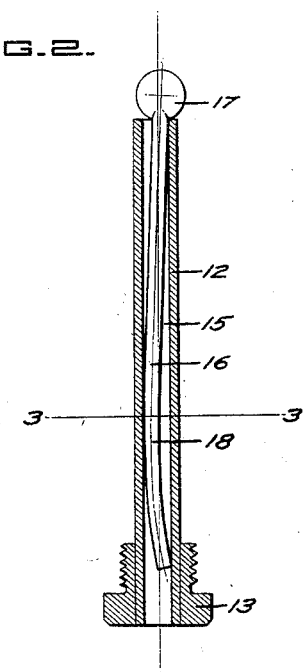
Fig. 2 is a vertical section of my improved feed tube with the central element shown in elevation.
Figure 3:
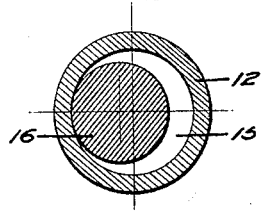
Fig. 3 is a section taken on the line 3—3 of Fig. 2.

Referring to the drawings in which 1 indicates a metallic cup or shell having a circular aperture 2 in its upper end, the lower end of the same being closed by a cap 3 carrying a threaded mounting stem 4 for securing the cup into the bearing. Within said cup 1 is a hollow cylindrical stem 5 carrying a piston at its lower end comprising metallic washers 6 and 7 with a washer 8 interposed between the same as shown. The washer 6 is provided with a suitable number of depressions 6', one of which is shown in Fig. 1. The washer 8 is made of a suitable flexible material impervious to oil and has a suitable number of openings 8' adapted to receive the depressed parts 6' which hold the washer 8 in position between the washers 6 and 7 without subjecting the washer 8 to undue pressure. A spring 9 surrounds the stem 5 and is spaced therefrom. The lower end of said spring is anchored in one of the depressions 6' of washer 6 and its upper end is anchored in a packing ring unit 10, which seals the upper end of the cup. By so anchoring the spring 9, there are no openings in the piston and leakage is avoided. Acting against the unit 10 the spring 9 forces the stem 5 and its piston towards the bottom of the cup in a manner readily understood. The upper end of the stem 5 is provided with a suitable fitting 11 to receive the conduit through which grease is introduced into the cup under pressure. The parts thus far referred to do not constitute a part of my present invention, a grease cup of this general type and construction being described and claimed in my pending application, Serial Number 750,381, filed Nov. 17, 1924. The same is here shown for the purpose of illustrating an application of my present invention and it is to be understood that my present invention may be used with any type of grease cup.

A discharge or feed tube 12, embodying my invention extends upwardly into the cup 1 and within the stem 5. This tube is preferably provided at its lower or discharge end with a screw head 13 which screws into a seat in the mounting stem 4. The screw head may be secured on the tube in any suitable manner or it may be formed integral therewith. The upper or inlet end of the tube 12 is disposed in the active grease zone of the cup, that is, the zone from which grease is displaced by the movement of the piston and into which grease is introduced when a charge of fresh grease is introduced into the cup. As the cup is charged with grease under pressure, the stem 5 is first filled and the grease then passes around the lower end of the stem into the cup, forcing the piston up against a shoulder 14 on the cup and consequently moving the stem outward to indicate the amount of grease contained within the cup. As the grease is discharged from the cup under the action of spring 9, the grease passes upward through the stem 5, around the tube 12 and into the upper or inlet end of said tube.

The discharge of lubricant through the tube 12 depends on several factors. Other factors being equal, it is obvious that in a given tube the rate of discharge in the cases of the lighter oils, lighter greases or lubricants of a semi-liquid character will be greater than in the cases of the heavier or stiffer oils and greases or lubricants of a semi-solid nature. In both cases, the resistance offered to the discharge of grease through the tube, other factors being equal, depends upon the length of the tube, that is the area of the friction surface, and the diameter of the bore of the tube, so that by varying either or both of these factors, the rate at which grease is discharged from the cup may be varied or controlled, as set forth in my copending application above referred to. Therefore, in order to secure a low rate of discharge in the cases of the lighter oils, lighter greases and lubricants of a semi-fluid character, it is necessary to provide a tube having a large friction surface and a bore of small diameter. Of course, the friction surface may be increased by increasing the length of the tube. It has not been found commercially practical to make a tube of the length required with a bore of the small diameter required to secure the low rate of discharge desired. It is of course understood that very small units of measure are here involved, which may be as low as several ten thousandths of an inch. I have therefore provided a discharge tube which is commercially practical and which has a large friction surface and a discharge passage of small cross-sectional area whereby a low rate of discharge in the cases of the lighter oils, greases, and the like is obtained. In carrying out my invention, I provide a tube 12 as described which is of the desired length and has a bore 15 of the usual small diameter which may be readily manufactured on a commercial scale. I reduce the size of said bore by inserting within said tube an element 16. Preferably the element 16 is a wire, which is a cheap article and very suitable for this purpose. The passage thereby secured is substantially ring-formed or of hollow cross-section. Obviously, the cross-sectional area of the bore or passage through the tube is thereby reduced, and its area is equal to the difference between the cross-sectional area of the bore 15 and the cross-sectional area of the member 16. In this manner, a passage of any desired cross-sectional area through the tube may be obtained by using wires of different sizes. The upper end of the wire 16 may be flattened, as indicated at 17, and may carry a designation of size, such as for example A, indicating the particular character of grease it is suited for. With the tube 12, a number of wires 16 may be provided of different diameters so that it will be suited for any character of lubricant. The head 17 also serves another useful purpose in that it prevents the complete insertion of the wire into the tube and provides means for its ready removal therefrom. Preferably, the wire 16 extends substantially the entire length of the tube 12, and is provided with a bend 18, which acts like a spring and securely holds the wire within the tube 12. While the cross-sectional area of the passage within the tube has been greatly reduced, it will be observed that a large frictional surface is obtained, namely, in addition to retaining the friction surface area of substantially the entire inner wall surface of the bore 15, the friction of the outer surface of the wire 16 has also been added, thereby greatly increasing the frictional area within the tube. While I have referred to the use of a wire in connection with my invention, it is of course understood that any other suitable element may be employed for this purpose which need not necessarily be bent as indicated at 18, nor be circular in cross-section.

I claim:

1. In a force feed grease cup having a mounting stem, a grease discharge tube secured to the stem and extending into the cup, means for exerting pressure on the grease in the cup to eject it through said tube and a wire of less diameter than the bore of the tube arranged in the tube to decrease the area of the passages therethrough and increase the surface with which the discharging grease contacts, said tube being removable from the bottom of the stem to permit replacement of the wire therein.

2. In a force feed grease cup having a mounting stem, a grease discharge tube disposed within said stem, means for exerting pressure on the grease in said cup to eject it thru said tube, means for securing said tube within said stem, said securing means being accessible from the exterior of said grease cup, a wire contained in said tube, and means on the end of the wire to stop its further entry into the tube and to permit withdrawal from the tube without dismounting the cup.

In testimony whereof, I have hereunto set my hand.

WILLIAM C. BRINTON, Jr.